Aug. 13, 1957

V. A. KINICKIJ 2,802,989

ROTOR DISPLACEMENT ANGLE INDICATOR
FOR SYNCHRONOUS MACHINES

Filed April 27, 1953

INVENTOR.

BY
Alexander Powell
Attorneys

Aug. 13, 1957

V. A. KINICKIJ 2,802,989

ROTOR DISPLACEMENT ANGLE INDICATOR
FOR SYNCHRONOUS MACHINES

Filed April 27, 1953

INVENTOR.
Victor A. Kinickij
BY
Alexander & Dowell
ATTORNEYS

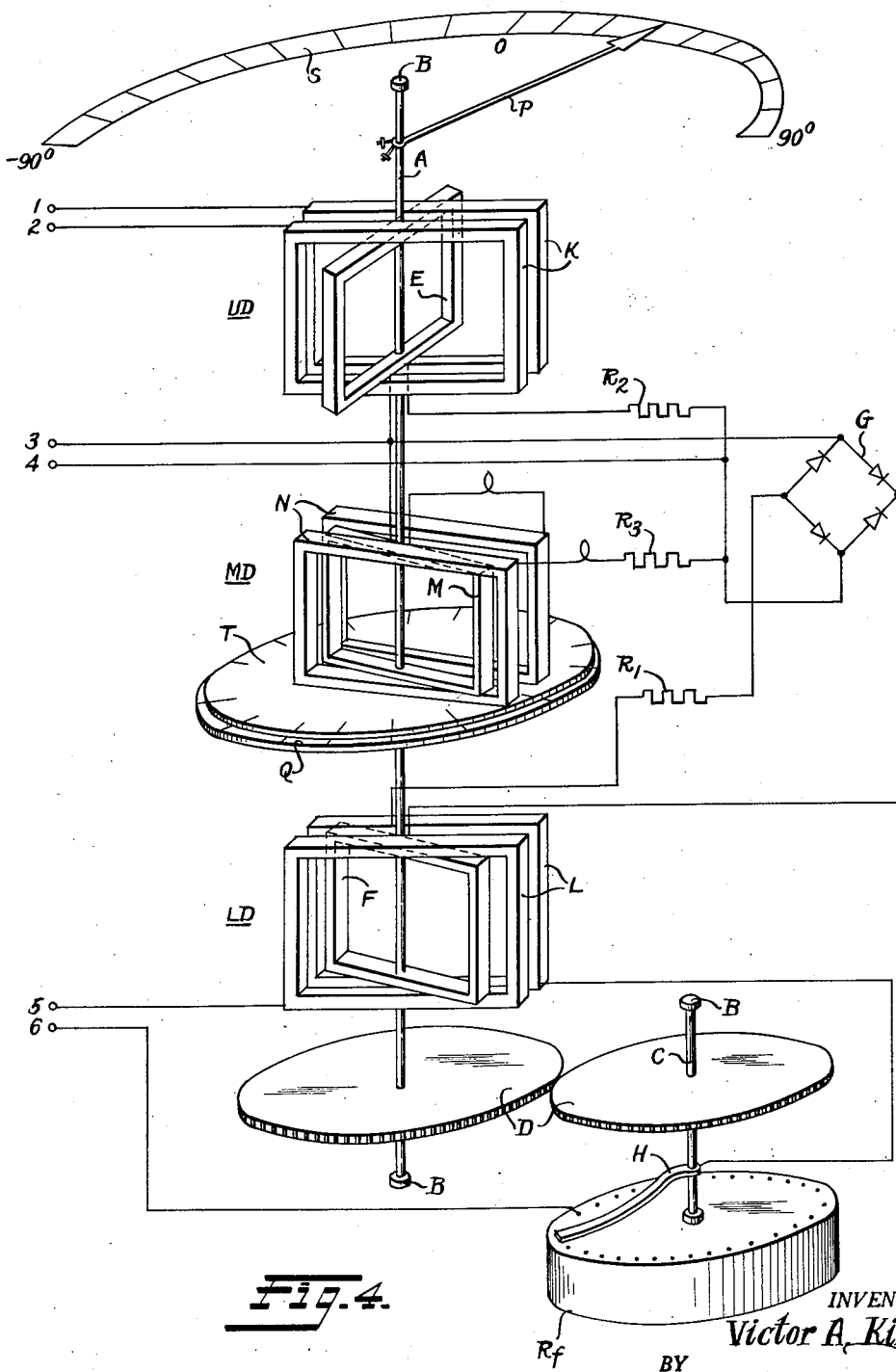

United States Patent Office 2,802,989
Patented Aug. 13, 1957

2,802,989

ROTOR DISPLACEMENT ANGLE INDICATOR FOR SYNCHRONOUS MACHINES

Viktor A. Kinickij, Caxingui, Sao Paulo, Brazil

Application April 27, 1953, Serial No. 351,389

14 Claims. (Cl. 324—158)

My invention is an improvement in rotor displacement angle indicators for synchronous machines, and this application is a continuation-in-part of my application filed April 27, 1951, Serial No. 223,347, now abandoned.

The term "rotor displacement angle" is also commonly referred to as the "internal angle" of the machine, which may be defined as the angle of the rotor relative to the terminal voltage under load, referred to the no-load position of the rotor. By this definition a zero displacement angle occurs when the machine is running with no load.

The principal object of my invention is to provide a rotor displacement angle measuring instrument utilizing a plurality of dynamometers, all attached to the same shaft, said shaft carrying at one end a pointer which cooperates with a dial, the latter being directly calibrated in degrees to read the displacement angle of the rotor.

Another very important feature of my invention is to provide an instrument of the above type wherein the common shaft of the instrument also operates a rheostat the position of which is changed as the shaft of the instrument rotates, thereby automatically compensating for various degrees of magnetic saturation of the field of the machine.

Another important object of my invention is to provide an instrument which is capable of measuring both positive and negative rotor displacement angles, thereby permitting the same instrument to be used both on synchronous motors and on synchronous generators.

Still another object of my invention is to provide an instrument having automatic compensating means to compensate for the magnetic flux in the air gap of a salient-pole type synchronous machine.

Other objects and advantages of my invention will become apparent during the following discussion of the drawings, wherein:

Fig. 4 shows an indicator corresponding to that shown schematically in Fig. 2, and shows gear means for operating the saturation-compensation rheostat, and further shows a pointer and dial assembly operatively associated with the shaft of the instrument.

Cylindrical rotor machine

Figure 1:
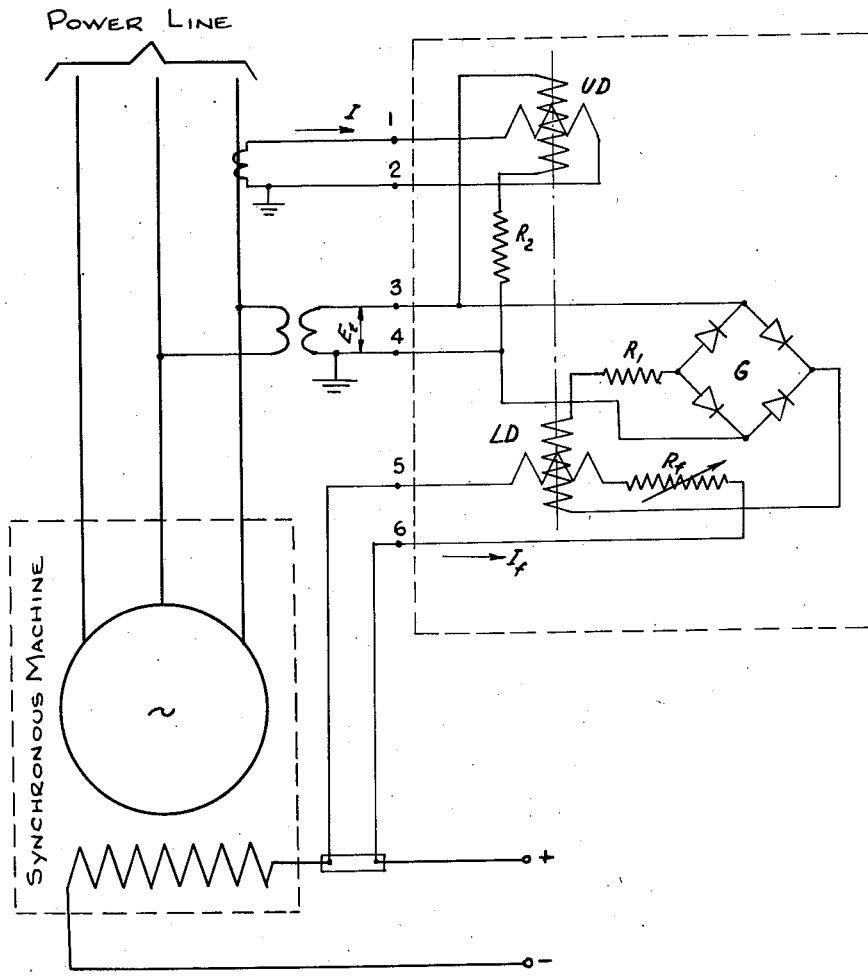
Fig. 1 shows a schematic diagram of a rotor displacement angle indicator for a cylindrical rotor synchronous machine.
Figure 3:
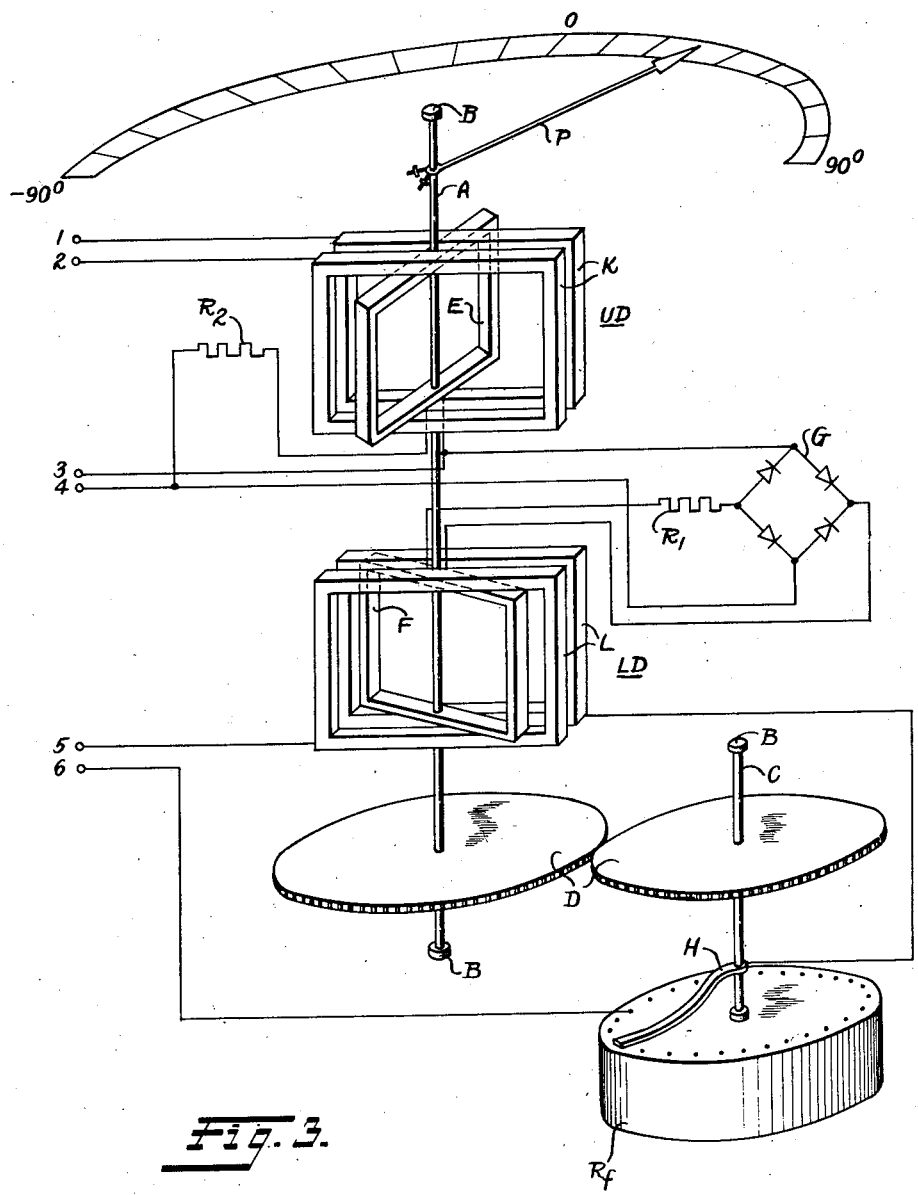
Fig. 3 shows a diagram of an indicator of the type shown schematically in Fig. 1, and further illustrates gear means for driving the saturation-compensation rheostat, and also shows the pointer and dial assembly.

The indicator shown in Figs. 1 and 3 includes an upper dynamometer UD and a lower dynamometer LD, the upper dynamometer including a set of fixed coils K and a movable coil E, and the lower dynamometer including a fixed set of coils L and a moving coil F. It will be noted that the moving coils E and F of the respective dynamometers are each secured to a common shaft A journaled in bearings B; and it should further be noted that the plane of the moving coil E is disposed normal to the plane of the moving coil F for the purpose hereinafter stated.

I also provide a dial scale S having a zero point in its center and having calibrations up to 90 degrees on each side of center, the dial S being associated with the pointer P, which pointer is carried by the shaft A. At the lower end of the shaft A is a pair of gears D transmitting drive from the shaft A to the shaft C to which is fixed the wiper H of a rheostat $R_f$.

The fixed coil K of the upper dynamometer is connected to a current transformer in the armature circuit, Fig. 1, the connection being made at the terminals 1 and 2, Fig. 3. The terminals 3 and 4 are connected to the secondary of a potential transformer, also in the armature circuit of the machine SM.

A resistance $R_2$ is connected in series between the moving coil E and the terminals 3 and 4; and, in addition, the terminals 3 and 4 are also connected to a full-wave rectifier G, the output of which rectifier is connected through a resistance $R_1$ across the moving coil F of the lower dynamometer LD.

The fixed coil L of the lower dynamometer is connected across the terminals 5 and 6 through the rheostat $R_f$, and the terminals 5 and 6 in turn are connected to a shunt in series with the field circuit of the synchronous machine, Fig. 1.

This instrument has no spring or gravity operated means associated with the shaft to determine the angular position thereof, but the position of the pointer P is controlled entirely by the deflecting torque of the upper dynamometer opposing the deflecting torque of the lower dynamometer though the rotation of the shaft is, of course, damped to a certain extent by inertia and bearing friction as well as by the drag of the rheostat wiper.

The deflecting torque of a dynamometer depends upon the sine of the angle between the moving and fixed coils, and therefore the deflection torque is maximum when the coils are at right angles to each other, and is zero when the moving and fixed coils lie in the same plane. The fixed coils K and L of the upper and lower dynamometers, respectively, are disposed in mutually parallel relation, but the moving coils E and F of the respective dynamometers are fixed to the shaft A at right angles to each other and the coils are connected in such a manner that the deflecting torques of each dynamometer are mutually opposed. Therefore, the moving system of the instrument will be at rest whenever the deflecting torque of the upper dynamometer is equal to the deflecting torque of the lower dynamometer.

The coils of the upper dynamometer are connected in the armature circuit of the machine and therefore the deflecting torque of the upper dynamometer will be proportional to the power output of the synchronous machine times the cosine of the deflecting angle of the coils.

The deflecting angle of the lower dynamometer is proportional to the terminal voltage of the machine times the field current thereof times the sine of the deflecting angle. The maximum power output, or the steady-state stability limit, of a synchronous machine is equal to the terminal voltage thereof multiplied by the internal voltage of the machine divided by the unsaturated synchronous reactance of the machine. On the other hand, the internal voltage divided by the synchronous reactance is equal to the short-circuit steady-state current of the synchronous machine, and therefore the steady-state stability limit of the machine will be equal to the terminal voltage multiplied by the steady-state short-cricuit current. The internal voltage of the synchronous machine, and therefore the steady-state short circuit current, is proportional to the field current, and these characteristics are straight lines for unsaturated conditions. It should therefore be apparent that the deflecting torque of the lower dynamometer will be proportional to the maximum power output of the synchronous machine for a given field current times the sine of the deflecting angle of the coils.

At balance, the deflecting torques of both dynamometers are equal to each other, and therefore the tangent of the deflecting angle will be proportional to the ratio of the present power output of the machine (upper dynamometer) to the maximum power output which the machine could furnish at the existing field excitation (lower dynamometer). The ratio of the power output to the maximum power is equal to the sine of the rotor displacement angle in a cylindrical rotor machine, and thus the tangent of the deflecting angle will be proportional to the sine of the rotor displacement angle. Therefore, the present indicator measures the ratio between the present output of the machine and its steady-state stability limit.

It is well known that a synchronous generator may also be run as a synchronous motor and that under such conditions the rotor displacement angle will be negative. From an inspection of Figs. 3 and 4 it will be seen that the dial scale is provided with both positive and negative angles with respect to the center of the scale, marked zero.

In an unsaturated synchronous machine, the upper dynamometer measures the power input and the lower dynamometer measures the steady-state stability limit of the pull-out power thereof. The deflection of the instrument will therefore be proportional to the ratio of these two values. However, in a saturated machine the rise of the field current is faster than the rise of the internal voltage, and therefore the steady-state stability limit (which is proportional to the internal voltage) will increase more slowly than the field current. Moreover, the more heavily a machine is to be loaded, the greater will be its rotor displacement angle and the more field current it will require. Therefore, I have provided saturation-compensation means whereby as the deflection of the moving system increases, the gears D will move the wiper H of the rheostat $R_f$ to a new position so that the resistance of $R_f$ in series with the fixed coil L will be changed enough to insure that the deflecting torque of the lower dynamometer will be proportional to the rise of the internal voltage of the machine instead of proportional to the rise of the field current thereof.

*Salient-pole machine*

Figure 2:
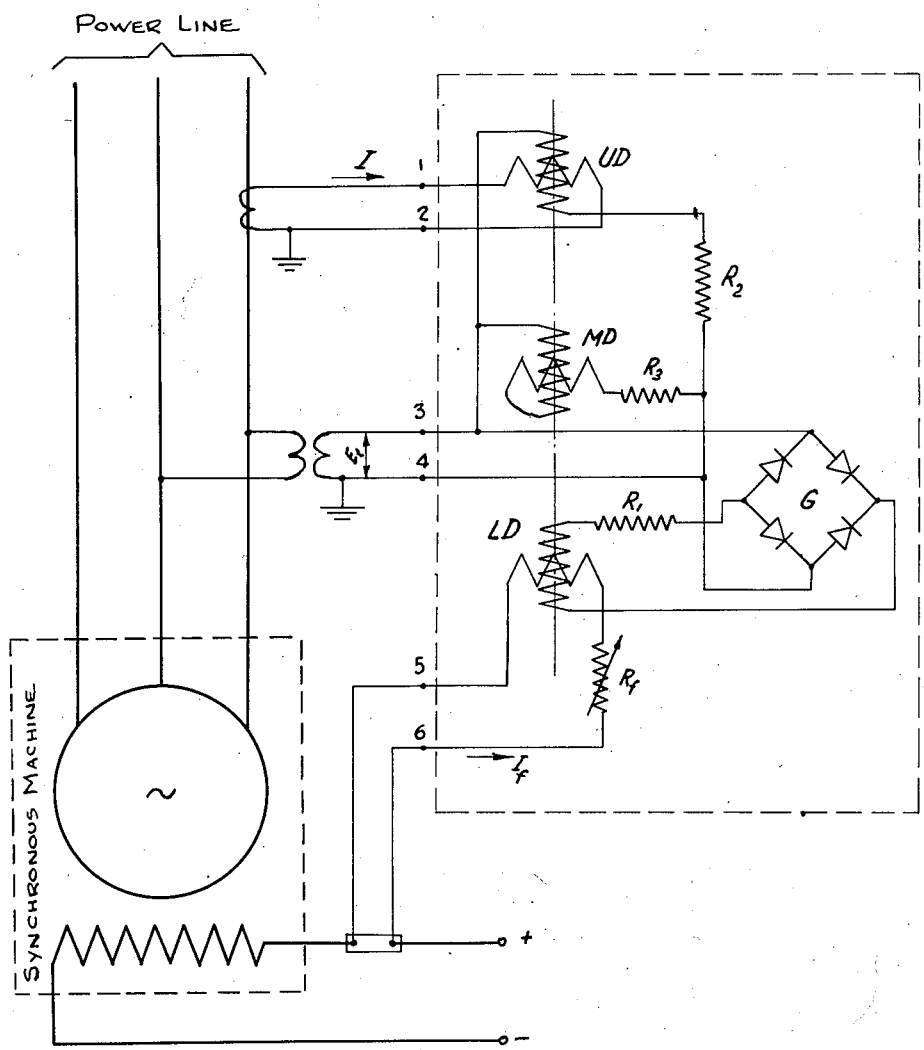
Fig. 2 shows a schematic diagram of a rotor displacement angle indicator for a salient-pole machine.

Figs. 2 and 4 show a rotor displacement angle indicator for use on a salient-pole synchronous machine, this indicator being identical to the indicator shown in Figs. 1 and 3 in that it carries a similar shaft, pointer and scale, as well as the same gearing D, and rheostat $R_f$, and the same upper and lower dynamometers. The principal difference is that in the device shown in Figs. 2 and 4, a middle dynamometer MD has been added to compensate for the air-gap flux effect occurring in salient-pole machines.

In Figs. 2 and 4 it will be seen that parts which are similar to those shown in Figs. 1 and 3 carry similar reference characters.

The moving coils M and F of the middle and lower dynamometers are respectively set parallel to each other on the shaft A, but the moving coil E of the upper dynamometer is set on the shaft A at right angles to said moving coils M and F. All three fixed coils K, N and L are set parallel to each other except that the fixed coil N of the middle dynamometer is set on a plate T which can be pivoted with respect to a fixed plate Q. These plates are marked off in degrees for the purpose hereinafter stated, thereby permitting the fixed coil N of the middle dynamometer to be placed at any angle with respect to the other two fixed coils.

As in the case set forth with respect to the cylindrical rotor machine, Figs. 1 and 3, the upper dynamometer has its coils connected to measure the armature current and voltage of the synchronous machine, and therefore its deflection torque is proportional to the present power output of the machine, and the lower dynamometer is connected in the armature and field of the machine to measure the maximum power output of which the machine is capable at the present field excitation. It will, however, be noted that the fixed and moving coils N and M of the middle dynamometers are connected mutually in series and across the terminals 3 and 4 which, in turn, are connected to a voltage transformer in the armature line of the synchronous machine, a resistance $R_3$ having been placed in series with the moving and fixed coils of the middle dynamometer.

The internal voltage causing the leakage reactance drop in a synchronous machine is induced by a resultant magnetic flux in the air-gap thereof. The air-gap flux is produced during rotation of the machine by the magnetomotive force of the field and the armature windings together. The direction of the field winding magnetomotive force coincides with the field winding axis, but the direction of the armature winding magnetomotive force varies with the power factor: At zero power factor it coincides with the field winding magnetomotive force and at unity power factor it is in quadrature with the field winding magnetomotive force. In cylindrical rotor machines, as distinguished from salient-pole machines, the air-gap is constant because the magnetomotive forces of both windings act upon the same magnetic circuit and the magnetic fluxes produced by them can be conveniently added vectorially. This fact simplifies the vector diagram of the cylindrical rotor machine, and the power output of such a machine is equal to the steady-state stability limit multiplied by the sine of the rotor displacement angle.

In salient-pole machines the air-gap is not constant as the machine rotates. The armature winding magnetomotive force can be resolved into the direct-axis and the quadrature-axis components. The direct-axis component operates over the same magnetic circuit as the field winding magnetomotive force and produces a comparable effect thereto. However, the quadrature-axis component is applied across the interpolar space with a great reluctance and therefore the flux produced per ampere is smaller than that of the direct-axis component and its distribution is markedly different from that of the direct-axis component.

The vector diagram of a salient-pole machine is thus different from that of a cylindrical rotor machine. The two-reaction theory of salient-pole considers the result of the direct- and quadrature-axis armature components separately and introduces two values of the synchronous reactance, for direct-axis and for quadrature-axis. The expression for the power output of a salient-pole machine in terms of terminal and internal voltages consists of two parts. The first part is equal to the internal voltage divided by the direct-axis synchronous reactance and multiplied by the terminal voltage and the sine of the rotor displacement angle, i. e., the same equation as for a cylindrical-rotor machine. The second part of the expression is equal to the square of the terminal voltage divided by twice the quadrature-axis and direct-axis synchronous reactances and multiplied by the difference between the direct-axis and the quadrature-axis reactances and by the sine of twice the rotor displacement angle. The second part considers the effect of saliency on the steady-state stability limit.

The effect of saliency on the steady-state stability limit will be taken into account by the middle dynamometer, Figs. 2 and 4. Both the coils of the middle dynamometer are connected in series and connected into the secondary circuit of a potential transformer, therefore the deflecting torque between the two coils will be proportional to the square of the terminal voltage times the sine of the angle between the moving and fixed coils. The moving coil M is parallel to the moving coil F of the lower dynamometer but the fixed coil N may be placed at any angle. Upon changing the angle of the coil N the deflection torque of the middle dynamometer will also change so that a point may be arrived at where the deflecting torque will be proportional to the sine of twice the rotor displacement angle.

The deflecting torques of the middle and lower dynamometers act in the same direction but the deflecting torque of the upper dynamometer acts in opposition. At balance the torque of the lower dynamometer will be equal to the torque difference of the upper and middle dynamometers. The tangent of the deflecting angle will be proportional to the ratio of the present power output of the machine minus a value proportional to the square of the terminal voltage and the sine of twice the rotor displacement angle, divided by the steady-state stability limit of a cylindrical rotor synchronous machine at the existing excitation. This ratio is equal to the sine of the rotor displacement angle of the salient-pole synchronous machine. Thus in this case also the tangent of the deflecting angle will be proportional to the sine of the rotor displacement angle of a salient-pole synchronous machine.

For a synchronous machine working as a synchronous motor the rotor displacement angle is negative, and therefore the scale S has also a negative calibration (Figs. 3 and 4). The action of the indicator remains the same except that the deflecting torque of the upper dynamometer will be proportional to the power input instead of the power output.

The saturation effect of salient-pole machines is compensated in this indicator in the same way as in the indicator for cylindrical rotor machines.

In Figs. 3 and 4 the gearing D is used for the control of the rheostat Rf but the friction of the gearing and the rheostat wiper can overdamp the moving system of the instrument and increase the deflection time. For measurements of the rotor displacement angle under transient conditions the moving system must be deflected very fast. Thus in taking transient measurements a phototube and relay can be used to control the rheostat Rf. A mirror would be placed on the main shaft of the instrument and a beam of light directed from a lamp to the mirror and reflected into the phototube. The phototube would be connected in the grid circuit of an electron tube used to operate a relay. The rheostat should have an electromagnet or another suitable electrical means for moving its shaft, and this electrical means would be connected into the output circuit of the phototube relay. Upon a deflection of the moving system the intensity of the reflected light beam received by the phototube will be changed, and this change will be used to operate the electrical means so that the shaft of the rheostat will be brought in a suitable position again.

I do not limit my invention to the exact forms shown in the drawings, for obviously changes may be made therein within the scope of the following claims:

I claim:

1. A rotor displacement angle indicator for a cylindrical-rotor synchronous machine having a direct current field and an armature circuit, comprising two electro dynamometers each having a fixed and a movable coil, said movable coils being secured on a common shaft, and one pair of similar coils of the two dynamometers being mutually parallel and the other similar pair of coils being disposed a right angles to each other, the fixed coil of said first dynamometer being connected in said armature circuit to receive a current proportional to the armature current, and the movable coil of said first dynamometer being connected in said armature circuit to receive a current proportional to the armature voltage, satid first dynamometer thereby providing a torque proportional to the present power output of said machine; a rectifier connected to said armature voltage circuit; and the second dynamometer having its movable coil connected to said rectifier to receive a rectified current proportional to the armature voltage of said machine and having its fixed coil connected to receive a portion of said field current whereby said second dynamometer will provide a counter-torque on said shaft proportional to the present maximum power which could be furnished by said machine at thte existing field excitation; and an indicator means on said shaft to indicate its angular position.

2. In an indicator as set forth in claim 1, a variable resistance in series with the field current delivered to said second dynamometer, said resistance comprising a rheostat linked to said shaft and adapted to be varied by changes in the angular position of the shaft to compensate for saturation of the field of the machine.

3. A rotor displacement angle indicator for a cylindrical-rotor synchronous machine having a direct current field and an armature circuit, comprising two electro dynamometers each having a fixed and a movable coil, said movable coils being secured on a common shaft and one pair of similar coils of the two dynamometers being mutually parallel and the other similar pair of coils being disposed at right angles to each other, the movable coil of said first dynamometer being connected in said armature circuit to receive a current proportional to the armature current, and the fixed coil of said first dynamometer being connected in said armature circuit to receive a current proportional to the armature voltage, said first dynamometer thereby providing a torque proportional to the present power output of said machine; a rectifier connected to said armature voltage circuit; and the second dynamometer having its fixed coil connected to said rectifier to receive a rectified current proportional to the armature voltage of said machine and having its movable coil connected to receive a portion of said field current whereby said second dynamometer will provide a counter-torque on said shaft proportional to the present maximum power which could be furnished by said machine at the existing field excitation; and an indicator means associated with said shaft to indicate its angular position.

4. In an indicator as set forth in claim 3, a variable resistance in series with the field current delivered to said second dynamometer, said resistance comprising a rheostat linked to said shaft and adapted to be varied by changes in the angular position of the shaft to compensate for saturation of the field of the machine.

5. A rotor displacement angle indicator for a salient-pole synchronous machine having a direct current field and an armature circuit, comprising three electro dynamometers each having a fixed and a movable coil, said movable coils all being secured on a common shaft and said fixed coils all being mutually parallel, the fixed coil of said first dynamometer being connected in said armature circuit to receive a current proportional to the armature current, and the movable coil of said first dynamometer being connected in said armature circuit to receive a current proportional to the armature voltage, said first dynamometer thereby providing a torque proportional to the present power output of said machine, a rectifier connected to said armature voltage circuit, the second dynamometer having its movable coil disposed at right angles to the movable coil of the first dynamometer and connected to said rectifier to receive a rectified current proportional to the armature voltage of said machine and having its fixed coil connected to receive a portion of said field current whereby said second dynamometer will provide a counter-torque on said shaft proportional to the present maximum power which could be furnished by said machine at the existing field excitation, and the third dynamometer having its two coils connected in series and connected to receive a current proportional to the armature voltage, the fixed coil of said third dynamometer being angularly adjustable with respect to said other fixed coils whereby said third dynamometer will provide a counter-torque on said shaft proportional to the square of the armature voltage multiplied by the sine of twice the rotor displacement angle of the machine; and an indicator means on said shaft to indicate its angular position.

6. In an indicator as set forth in claim 5, a variable resistance in series with the field current delivered to said second dynamometer, said resistance comprising a rheostat linked to said shaft and adapted to be varied by changes in the angular position of the shaft to compensate for saturation of the field of the machine.

7. A rotor displacement angle indicator for a salient-pole synchronous machine having a direct current field and an armature circuit, comprising three electro dynamometers each having a fixed and a movable coil, said movable coils all being secured in mutually parallel relation on a common shaft, the fixed coil of said first dynamometer being connected in said armature circuit to receive a current proportional to the armature current, and the movable coil of said first dynamometer being connected in said armature circuit to receive a current proportional to the armature voltage, said first dynamometer thereby providing a torque proportional to the present power output of said machine, a rectifier connected to the armature voltage circuit, the second dynamometer having its movable coil connected to said rectifier to receive a rectified current proportional to the armature voltage of said machine and having its fixed coil connected to receive a portion of said field current, the fixed coils of said dynamometers being disposed at right angles with respect to each other whereby said second dynamometer will provide a counter-torque on said shaft proportional to the present maximum power which could be furnished by said machine at the existing field excitation, and the third dynamometer having its two coils connected in series and connected to receive a current proportional to the armature voltage, the fixed coil of said third dynamometer being angularly adjustable with respect to said other fixed coils whereby said third dynamometer will provide a counter-torque on said shaft proportional to the square of the armature voltage multiplied by the sine of twice the rotor displacement angle of the machine; and an indicator means associated with said shaft to indicate its angular position.

8. In an indicator as set forth in claim 7, a variable resistance in series with the field current delivered to said second dynamometer, said resistance comprising a rheostat linked to said shaft and adapted to be varied by changes in the angular position of the shaft to compensate for saturation of the field of the machine.

9. In an indicator as set forth in claim 7, said indicator means being calibrated in both plus and minus rotor displacement angles, the indicator reading minus angles when the machine is run as a motor and reading plus angles when the machine is run as a generator.

10. A rotor displacement angle indicator for a cylindrical-rotor synchronous machine having a direct current field and an armature circuit, comprising two electro dynamometers each having a fixed and a movable coil, said movable coils being secured on a common shaft and one pair of similar coils of the two dynamometers being mutually parallel and the other similar pair of coils being disposed at right angles to each other, the coils of the first dynamometer being connected to respectively receive voltage and current from said armature circuit to provide a torque proportional to the present power output of said machine, a rectifier connected to said armature voltage circuit, and the second dynamometer having one coil connected to the rectifier to receive a rectified current proportional to the armature voltage of said machine and having its other coil connected to receive a portion of said field current whereby said second dynamometer will provide a counter-torque on said shaft proportional to the present maximum power which could be furnished by said machine at the existing field excitation, one pair of similar coils of the two dynamometers being respectively connected to receive currents from the armature voltage circuit; and an indicator means on said shaft to indicate its angular position and calibrated in terms of rotor displacement angles.

11. In an indicator as set forth in claim 10, a variable resistance in series with the field current delivered to said second dynamometer, said resistance comprising a rheostat linked to said shaft and adapted to be varied by changes in the angular position of the shaft to compensate for saturation of the field of the machine.

12. A rotor displacement angle indicator for a salient-pole synchronous machine having a direct current field and an armature circuit, comprising three electro dynamometers each having a fixed and a movable coil, said movable coils all being secured on a common shaft, the coils of the first dynamometer being connected to receive voltage and current from said armature circuit to provide a torque proportional to the present power output of said machine, a rectifier connected to the armature voltage circuit, the second dynamometer having one coil connected to the rectifier to receive a rectified current proportional to the armature voltage of said machine and having its other coil connected to receive a portion of said field current whereby said second dynamometer will provide a counter-torque on said shaft proportional to the present maximum power which could be furnished by said machine at the existing field excitation, one pair of similar coils of the two dynamometers being mutually parallel and the other similar pair of coils being disposed at right angles to each other, and one of said similar pairs being connected to receive currents from the armature voltage circuit, and the third dynamometer having its two coils connected in series and connected to receive a current proportional to the armature voltage and the fixed coil of said third dynamometer being angularly adjustable with respect to said other fixed coils whereby said third dynamometer will provide a counter-torque on said shaft proportional to the square of the armature voltage multiplied by the sine of twice the rotor displacement angle of the machine; and an indicator means associated with said shaft to indicate its angular position and calibrated in terms of rotor displacement angles.

13. In an indicator as set forth in claim 12, a variable resistance in series with the field current delivered to said second dynamometer, said resistance comprising a rheostat linked to said shaft and adapted to be varied by changes in the angular position of the shaft to compensate for saturation of the field of the machine.

14. In an indicator as set forth in claim 12, said indicator means being calibrated in both plus and minus rotor displacement angles, the indicator reading minus angles when the machine is run as a motor and reading plus angles when the machine is run as a generator.

References Cited in the file of this patent

UNITED STATES PATENTS

| | | |
|---|---|---|
| 1,677,378 | Albrecht | July 17, 1928 |
| 2,300,814 | Scaife | Nov. 3, 1942 |